(12) United States Patent
Wolfe et al.

(10) Patent No.: US 8,500,007 B2
(45) Date of Patent: Aug. 6, 2013

(54) SYSTEM AND METHOD FOR MERCHANT INTERACTION WITH AND TRACKING OF THE SECONDARY GIFT CARD MARKETPLACE

(75) Inventors: Jason Wolfe, Sewickley, PA (US); Mark Romanelli, Bridgeville, PA (US); Sanjay Akut, Pittsburgh, PA (US); Mike Kelly, Langhorne, PA (US); Mary Jane Kelly, Langhorne, PA (US)

(73) Assignee: Giftcodes.com, LLC, Pittsburgh, PA (US)

(*) Notice: Subject to any disclaimer, the term of this patent is extended or adjusted under 35 U.S.C. 154(b) by 286 days.

(21) Appl. No.: 12/701,711

(22) Filed: Feb. 8, 2010

(65) Prior Publication Data

US 2011/0079644 A1 Apr. 7, 2011

Related U.S. Application Data

(63) Continuation-in-part of application No. 12/573,060, filed on Oct. 2, 2009.

(51) Int. Cl.
*G06K 5/00* (2006.01)

(52) U.S. Cl.
USPC ......................................................... 235/380

(58) Field of Classification Search
USPC ................... 235/379, 380, 381, 383; 705/35
See application file for complete search history.

(56) References Cited

U.S. PATENT DOCUMENTS

| | | | |
|---|---|---|---|
| 7,424,452 B2 * | 9/2008 | Feilbogen et al. | 705/37 |
| 7,494,048 B2 | 2/2009 | Gusler et al. | |
| 7,527,192 B1 * | 5/2009 | Chaskin et al. | 235/379 |
| 7,624,921 B1 | 12/2009 | Beck et al. | |
| 8,152,060 B2 | 4/2012 | Wolfe et al. | |
| 8,152,061 B2 | 4/2012 | Wolfe et al. | |
| 2001/0007098 A1 | 7/2001 | Hinrichs et al. | |
| 2003/0004828 A1 | 1/2003 | Epstein | |
| 2004/0078325 A1 | 4/2004 | O'Connor | |
| 2004/0219971 A1 | 11/2004 | Ciancio et al. | |

(Continued)

FOREIGN PATENT DOCUMENTS

WO   WO 2008/013045   1/2008

OTHER PUBLICATIONS

Swapagift.com Expands its "Cash For Your Card" program. Retrieved from http:///www.prweb.com/releases/2003/12/prweb96305.htm on Nov. 9, 2011.

(Continued)

*Primary Examiner* — Jamara Franklin

(57) ABSTRACT

Disclosed herein are systems, methods, and non-transitory computer-readable storage media for tracking a secondary gift card marketplace. A system configured to practice the method collects data related to a secondary market, which includes a transaction associated with a gift card, the transaction not involving an issuer of the gift card, processes the collected data, and presents at least a portion of the processed collected data to a merchant in a user interface. Gift cards can include at least one of gift cards and gift codes. The collected data can further include a plurality of transactions associated with gift cards. In one aspect, each gift card transaction in the plurality of gift card transaction does not involve an original issuing merchant of a gift card. The collected data can further include at least one of pricing, demographic, geographic, and other information related to the gift card transactions.

17 Claims, 5 Drawing Sheets

U.S. PATENT DOCUMENTS

| | | |
|---|---|---|
| 2005/0171902 A1 | 8/2005 | Nguyen |
| 2005/0228717 A1* | 10/2005 | Gusler et al. .................. 705/14 |
| 2006/0037835 A1 | 2/2006 | Doran et al. |
| 2007/0055568 A1 | 3/2007 | Osborne |
| 2007/0075134 A1 | 4/2007 | Perlow et al. |
| 2007/0156513 A1* | 7/2007 | Mastrianni et al. ............ 705/14 |
| 2007/0205269 A1 | 9/2007 | Lindon |
| 2007/0272736 A1 | 11/2007 | Brooks et al. |
| 2007/0284433 A1* | 12/2007 | Domenica et al. ............ 235/379 |
| 2008/0162271 A1 | 7/2008 | Benjamin |
| 2008/0162299 A1 | 7/2008 | Gusler et al. |
| 2008/0294518 A1 | 11/2008 | Weiss et al. |
| 2008/0296368 A1 | 12/2008 | Newsom |
| 2009/0171773 A1 | 7/2009 | Shastry |
| 2009/0265269 A1 | 10/2009 | Stoecker |
| 2010/0057580 A1 | 3/2010 | Raghunathan |
| 2010/0070290 A1 | 3/2010 | Marturana et al. |
| 2010/0280921 A1 | 11/2010 | Stone et al. |
| 2010/0299194 A1 | 11/2010 | Snyder et al. |
| 2011/0106698 A1 | 5/2011 | Isaacson et al. |
| 2011/0213674 A2 | 9/2011 | Shpun et al. |
| 2012/0016725 A1 | 1/2012 | Kraft et al. |

OTHER PUBLICATIONS

Swapathing, Inc Announces The Internet's First Online Gift Card Exchange. Retrieved from http://www.prweb.com/releases/2003/10/prweb83758.htm on Nov. 9, 2011.

Cash for your card now! Retrieved from www.swapagift.com on Nov. 9, 2011.

Offenberg. "Markets: Gift Cards". Journal of Economic Perspectives. vol. 21, No. 2, Spring 2007 [Retrieved from the Internet] <URL:http://myweb.Imu.edu/jpate/JEP_2007.pdf>. pp. 227-238.

"What is SwapAGift.com?" retieved from http://www.swapagift.com/ on Oct. 25, 2011.

* cited by examiner

US 8,500,007 B2

SYSTEM AND METHOD FOR MERCHANT INTERACTION WITH AND TRACKING OF THE SECONDARY GIFT CARD MARKETPLACE

PRIORITY CLAIM

The present application is a continuation-in-part of U.S. application Ser. No. 12/573,060, filed Oct. 2, 2009, which is incorporated herein by reference.

RELATED APPLICATIONS

This application relates to application Ser. Nos. 12/573,042, 12/573,056 and 12/573,060.

BACKGROUND

1. Technical Field

The present disclosure relates to the secondary gift card marketplace and more specifically to allowing merchants to track and aggregate information about the secondary gift card marketplace.

2. Introduction

Gift cards and gift codes are widely used as gifts for birthdays, Christmas, and other holidays. Gift cards and gift codes are closed loop, meaning that the value represented by a gift card or gift code is a valid form of payment at a closed set of retailers. For example, an Outback Steakhouse® gift card/code is only redeemable at Outback Steakhouse® and not at Planet Hollywood® or Target®. Some closed loop cards and codes are valid at a family of closely related or commonly owned merchants. For example, a Darden Restaurants gift card/code is valid at Red Lobster® and Olive Garden®, or a local mall gift card/code is valid at tenant merchants in the local mall. Open loop gift cards (and gift codes), in contrast, are a valid form of payment at virtually every retailer nationwide, such as Visa® or Mastercard® debit cards.

Gift cards/codes are a popular alternative to giving cash or a merchandise item which the recipient may or may not like. However, the recipient may not be able to redeem the gift card/code due to geographic limitations, personal disinterest in the merchant who issued the gift card/code, or other reasons. Additionally, some merchants issue gift cards/codes with significant restrictions, complex fees, and/or an expiration date. According to one estimate, consumers purchase about $80 billion worth of gift cards annually in the U.S. and roughly 10%, or $8 billion, of that amount goes unredeemed. Consumers waste these unredeemed funds and do not benefit from the full value of the gift card/code. Further, if these funds are not spent, they can escheat to the state. Merchants cannot track post-issuance gift card transactions which do not involve the issuing merchant.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Some consumers resell or exchange their unwanted or unusable gift cards/codes in what is termed a secondary marketplace. The secondary marketplace is a collection of transactions involving gift cards and/or gift codes which do not involve an original gift card or code issuer. For example, Sears issues a $100 gift card to a Mary. Mary gives the gift card to Larry. Larry uses $50 of the gift card to purchase merchandise from Sears. That use of the gift card is not part of the secondary marketplace because it involves the gift card issuer, Sears. Other transactions that Larry conducts with the remaining balance are part of the secondary market. For example, if Larry sells the $50 balance remaining on the gift card for $35 in cash, that transaction is part of the secondary market. If Larry divides the $50 balance remaining on the gift card into two $25 gift cards, that transaction is part of the secondary market because it does not directly involve the gift card/code issuer.

The merchants who originally issued the gift cards or codes are unable to track this secondary gift card/code market in any meaningful way, potentially leading to lost revenues and marketing opportunities.

The disclosure first discusses an exemplary system and various components thereof that address these issues. The disclosure then turns to a more specific example configuration of how a secondary market for gift codes and gift cards can operate. The disclosure demonstrates an example merchant interface for tracking the secondary market. Finally, the disclosure turns to the exemplary method embodiment.

Figure 1:
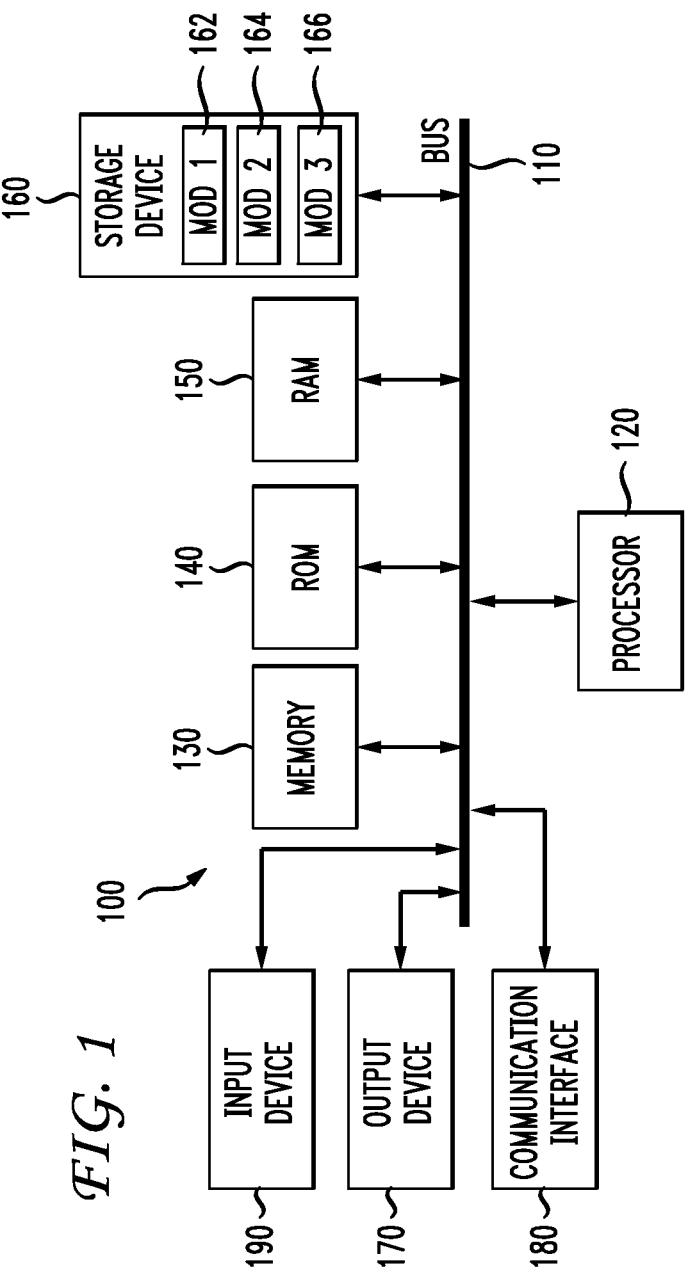
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having discussed some basic system components, the disclosure returns to a discussion of gift cards and codes and tracking the secondary gift card market. Gift cards/codes are divided into open loop and closed loop cards/codes. Typically issuing banks or credit card companies issue open loop cards/codes (example: Visa, MasterCard, Amex or Discover) which can be redeemed by virtually any business entity. These differ from closed loop cards/codes which are typically issued by a specific store or restaurant and can be only redeemed by the issuing provider (example: Sears, Red Lobster, Target). Gift cards/codes are one common form of closed loop cards/codes. The physical card/code and the card/code number associated with the card/code are interchangeable concepts. Gift cards/codes can store a reference to the amount of money within a physical card/code or can store a reference to an external database of accounts which references an amount of money. One or more external database can maintain funds from which each of a set of accounts linked to a card/code can draw. Throughout this disclosure, closed loop cards and other gift cards are interchangeable with a closed loop code or other gift code which serves the same purpose as a physical closed loop card.

Figure 2:
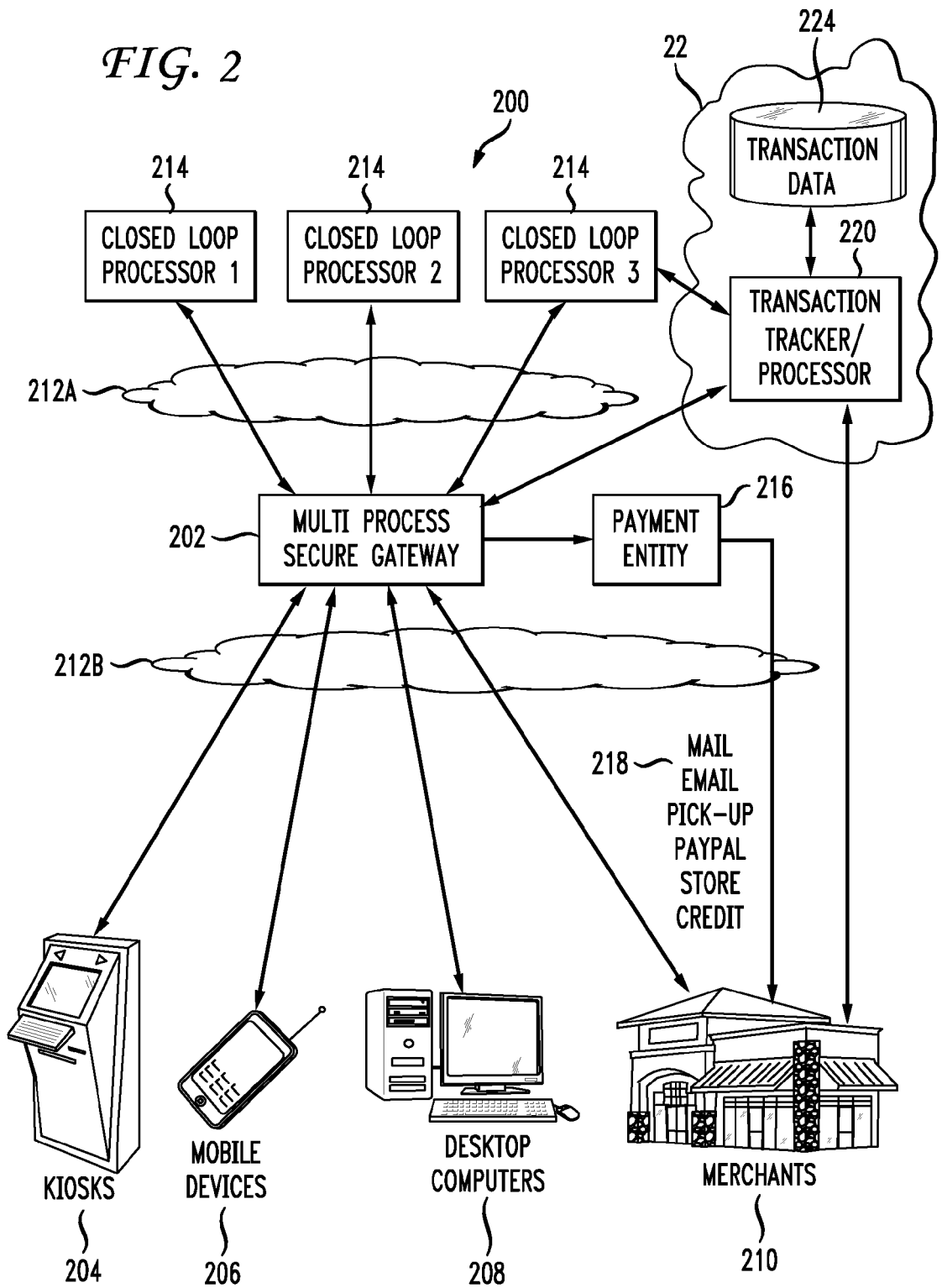
FIG. 2 illustrates an example multi-process secure gateway configuration.

The disclosure now turns to FIG. 2 which illustrates a multi-process secure gateway configuration 200 including a transaction tracker/processor 220. The multi-process secure gateway 202 can be implemented as a local or remote server, a group of tightly or loosely interconnected servers, integrated as a software module within a point of sale device, or as any other suitable device, software, or combination thereof. In FIG. 2, the multi-process secure gateway 202 is shown as a single conceptual server available over a network 212B such as the public telephone network or the Internet. The multi-process secure gateway 202 interacts with various requesters, such as kiosks 204, mobile devices 206, desktop computers 208, and merchants' point of sale devices 210, which submit information uniquely identifying closed loop cards/codes. Mobile device 206 can also represent a standard telephone as well as communication with an interactive voice response system.

Each of these devices can interact with the secure gateway 202 through different protocols, such as a direct network connection, an HTTP-based portal, SMS messages, telephone, interactive voice response systems, point-of-sale (POS) terminals, etc. In the case of merchants, each point of sale of the merchant 210 can connect to a centralized merchant server, not shown, which relays requests to the secure gateway 202 on behalf of all the merchant 210 point of sale devices. Other configurations also exist. In one aspect, this process is called "Cash4Card" (name used for description purposes only). Merchants 210, kiosks 204, other devices and/or locations, including online storefronts, which provide an interface to the secure gateway 202 can provide an easily recognizable visual or other indication readily indicating to potential customers that they accept gift cards/codes under the Cash4Card program. The indication can be a window sticker, an online image, or other sign displayed in a manner similar to the well-known overlapping circles for MasterCard® or the blue and orange bars over and under the word VISA®.

The secure gateway 202 interacts with multiple closed loop processors 214, such as FirstData and Chase Paymentech, over a network 212A such as the Internet. These closed loop processors are entities that process closed loop cards, and are different from a computer processor such as an AMD Phenom II or Intel Core 2 Duo. The secure gateway 202 can perform any action on the closed loop card/code through the various closed loop card/code processors 214 as if the secure gateway 202 was a closed loop merchant. The secure gateway 202 analyzes the submitted information to determine which closed loop processor handles that type of closed loop card/code. For example, a particular series of numbers or letters can indicate that one closed loop card/code is honored by Paymentech, and another distinct set of numbers or letters indicates that another closed loop card/code is honored by FirstData.

The logic and analysis in the secure gateway 202 can change from time to time as new types of cards/codes are issued by existing closed loop processors 214 or as the secure gateway 202 adds interfaces for new closed loop processors. The secure gateway 202 can include a common application programmer interface (API) which defines actions which may be performed through the closed loop processors 214. The API translates API calls to the corresponding specific sets of proprietary interactions with the various closed loop processors 214, which may be very different between closed loop processors 214.

The secure gateway 202 determines the balance of the closed loop card/code from the closed loop processor 214 and offers to purchase the closed loop card/code from the requestor, typically at a price lower than the face value of the card/code (though not always and can be at or above the face value). If the requestor provides an indication of agreement to sell the closed loop card/code, then the secure gateway deactivates the closed loop card/code associated with the submitted information, issues a new closed loop card/code in that amount (which may be a physical closed loop card/code or a virtual closed loop card/code), and pays the purchase price to the requestor through a payment entity 216.

The payment entity 216 can be a merchant that pays the requestor while another entity settles with the merchant. The gateway 202 can also provide instructions to other entities to perform the deactivation, issuance, payment, and other steps. The payment entity 216 can be part of the secure gateway 202, part of a merchant point of sale equipment 210, or a separate entity altogether. The secure gateway 202 can provide additional instructions regarding how to transfer payment 218 to the requestor. Some examples of how to transfer payment include mailing a physical open loop card/code to the requestor, emailing to the requestor the necessary information to use a non-physical open loop card/code (such as an account number and PIN), notifying a local financial service to prepare an amount of money for pickup (such as MoneyGram or Western Union), transferring funds to an electronic account (such as PayPal), transferring money to a requestor's existing open loop card/code (such as an OmniCard or other debit card/code), adding funds to an existing credit card or debit card, any other form of electronic funds transfer (EFT), or granting store credit or any other form of currency usable at a store to the requestor. The payment entity 216 can also provide payment to the requestor using other suitable approaches. Transactions processed through the secure gateway 202 constitute part of the secondary market if they do not directly involve the gift card issuer.

The transaction tracker/processor 220 can receive and/or retrieve information regarding completed, in-process, and/or attempted transactions from the secure gateway 202. The transactions with the secure gateway 202 represent the secondary marketplace for gift cards and gift codes. In the secondary marketplace, non-original issuers of gift cards and codes sell and/or trade the gift cards for cash or for other goods or services. The transaction tracker/processor 220 can be incorporated as part of the secure gateway 202 or can be a separate entity communicating through a network 222 as shown in FIG. 2.

The transaction tracker 220 processes the secondary marketplace transaction information and stores all or part of the processed information in a transaction data repository 224. The transaction tracker 220 can aggregate all or part of the received data, and can categorize data by date, geographical region, type of gift card or code, gift card face value, gift card redemption value, customer habits, whether or not a portion of the gift card had been used, whether a customer is participating in the secondary gift card market for the first time, what the gift card was sold for (i.e. was the gift card exchanged at a merchant, for another gift card, split into smaller denominations, etc.), and so forth. The transaction tracker 220 can provide closed loop processors 214, merchants 210, and/or other interested or involved entities an interface to view, sort, analyze, and otherwise manipulate the stored transaction data 224. In one aspect, a merchant 210 can view detailed information regarding individual transactions associated with gift cards/codes issued by that merchant 210, but only broad statistical data regarding gift cards/codes issued by other merchants.

In one aspect, the transaction tracker 220 provides a web-based user interface. The interface can allow closed loop merchants to compare aggregated statistics to their own statistics. For example, a nationwide office supply retailer can compare the secondary market statistics for their own gift cards to the secondary market of other nationwide office supply retailers to determine trends. The retailer can then exploit these trends with marketing campaigns, in-store promotions, online ads, or other methods.

The transaction tracker 220 can also collect personally identifiable information, such as a phone number, email address, or credit card number associated with each transaction. However, for the sake of privacy, the transaction tracker 220 can strip this information out when providing reports through the interface to the various requesting entities. In one aspect, the transaction tracker 220 offers a user a more favorable price for the gift card on the secondary market in exchange for more detailed personal and/or demographic information. For example, the secure gateway 202 offers a user $34 in cash for a $50 gift card. However, if the user agrees to spend a few minutes to fill out a survey and divulge some more detailed personal information, the transaction tracker 220 can authorize the secure gateway 202 to offer the user $38 in cash instead of $34.

The transaction tracker 220 can also track redemption specific data such as at which specific stores or websites the cards or codes are redeemed. In the case of online redemption, the transaction tracker 220 can track referral websites (i.e. which site referred the customer to the online redemption page). The transaction tracker 220 can disclose all, part, or none of this information to merchants. In one brick and mortar merchant example, if a large number of customers redeem their closed-loop cards and codes at Wal-Mart and Target, the transaction tracker 220 can provide this information to either Wal-Mart or Target so that they can approach issuers of the redeemed cards regarding potential cooperative marketing opportunities.

The transaction tracker 220 can track data indicating which individual store sold each redeemed card or code. Such data allows merchants to identify the origin of redeemed cards through an interface such as the one shown in FIG. 3. For instance, Best Buy can log into the merchant interface and see data indicating from which specific stores and/or states the secondary market gift card originated. If the data show an large influx of cards redeemed in the secondary marketplace which were issued at Store #1395 in Quakertown, Pa., may be that is an indication that customers don't like shopping at that store. Best Buy can drill down in to the other data related to these transactions which may shed additional light on the matter.

Additionally, as with virtually any marketplace, one concern is how to detect and prevent fraud in the secondary gift card and gift code marketplace. In one aspect, the transaction tracker 220 tracks and provides information to merchants about fraud related or potentially fraud related trends or individual transactions. For example, if the secure gateway 202 of FIG. 2 processes cards that stolen, the transaction tracker 202 can identify the location, date, time of day, and other information that may be valuable to Merchants. Similarly, some customers attempt to obtain "store credit" via fraud. The transaction tracker 220 can include a fraud alert module that compares transaction information against informational templates which may be indicators of fraud. Alternatively, the transaction tracker 220 can provide the available information to a user without further fraud analysis so that the user can make investigate potential fraud issues.

Figure 3:
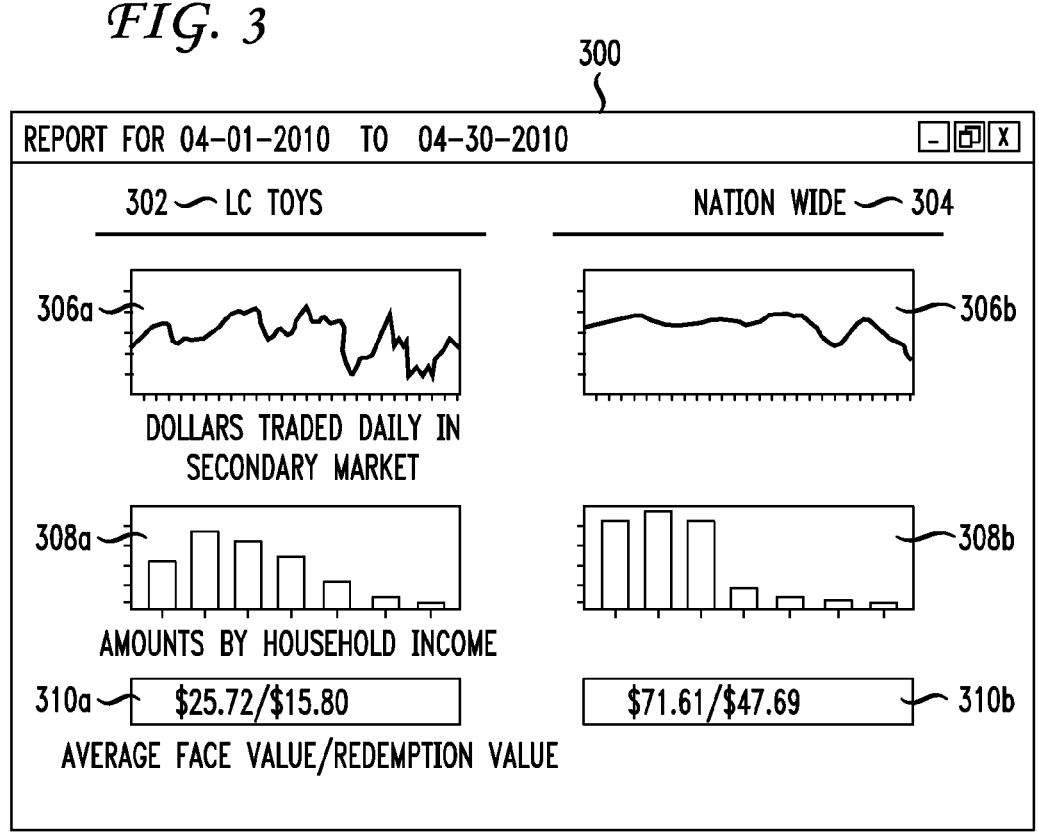
FIG. 3 illustrates an exemplary merchant interface for tracking the secondary market.

FIG. 3 illustrates an exemplary merchant interface 300 for tracking the secondary market. The interface 300 can be part of a computer application, a web application, client-server application, etc. In one aspect, merchants create an account with a server providing the merchant interface. Merchants then log in using a secure connection to the server. A merchant can track various statistics regarding the secondary market for gift cards associated with that merchant. FIG. 3 shows a user interface 300 displaying charts and reports based on secondary gift card market data for an example merchant LC Toys 302 and the nationwide 304 secondary gift card market.

The interface 300 can include a chart of the amount of dollars traded daily in the secondary market for LC Toys 306a and nationwide 306b. The interface 300 can include a chart based on demographic information such as household income 308a, 308b. Further, the interface can include significant points of information such as the average face value and average redemption value, i.e. what price customers accepted as payment for their closed loop gift cards or codes 310a, 310b. The interface can report other statistics and use other reporting approaches (i.e. pie charts, line graphs, circle graphs, histograms, tables, and so forth).

In one aspect, merchants who log in can export all or part of the source data, such as to a text comma-separated value (CSV) file or a SQL database. In another aspect, merchants can search for and sort specific data. Merchants can even create custom reports based on a specific expression in a query language.

Figure 4:
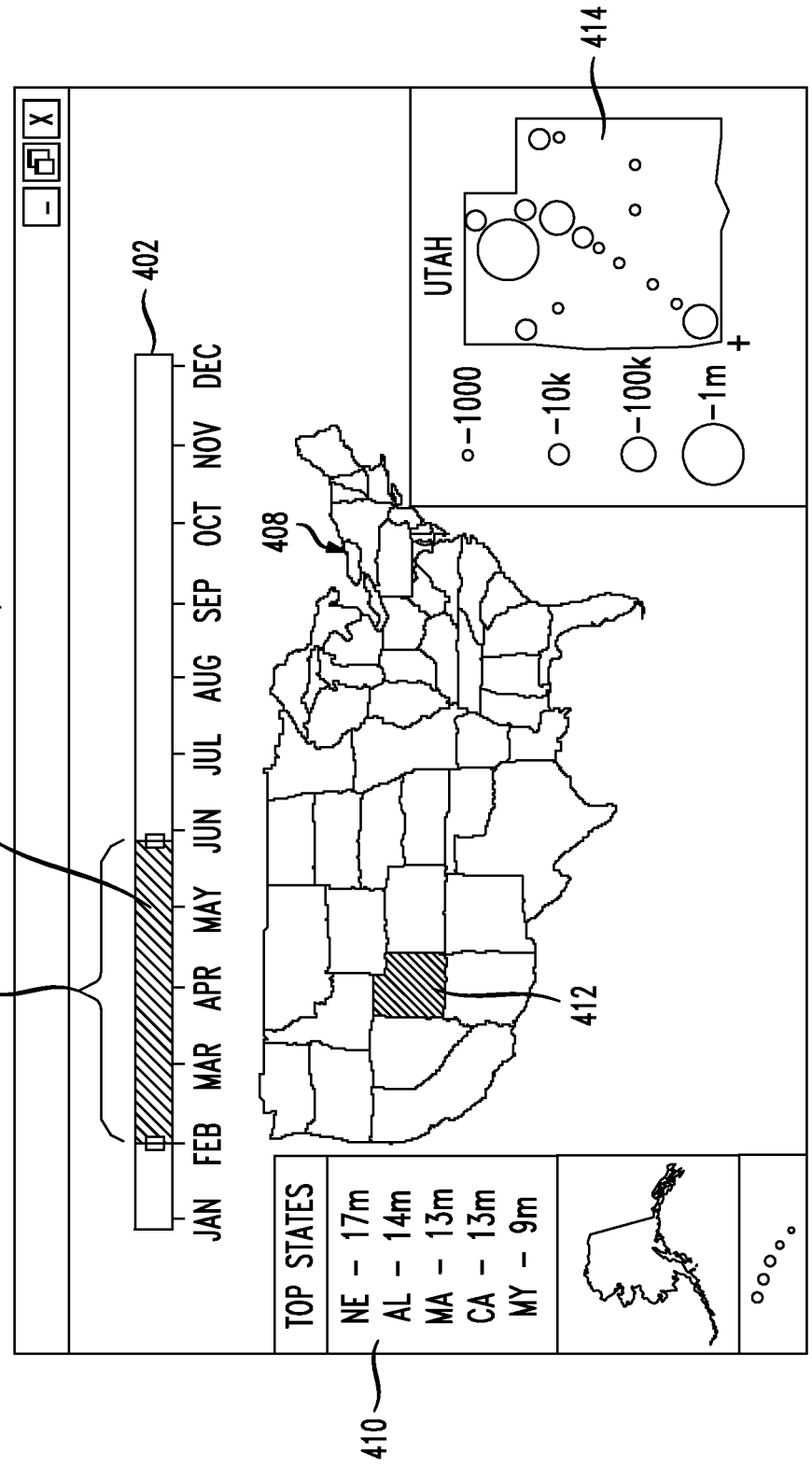
FIG. 4 illustrates an example geographical diagram tracking the secondary market.

FIG. 4 illustrates an example geographical diagram 400, such as a map 408, tracking the secondary market. This geographical diagram 400 can be separate from or included as part of the exemplary merchant interface 300 shown in FIG. 3. A merchant can specify the time frame over which the data is shown on the map using, for example, a time bar 402 and draggable sliders 404 to select a shaded area 406. As the merchant selects the time frame and specifies other variables to report on the map 408, the system can update the map 408 dynamically. The geographical diagram 400 can also provide some statistics of interest to the region shown in the diagram. For example, a list of the top five states 410 sorted by the amount of gift cards redeemed over a certain period of time.

The system can also allow the user to drill down and get more specific information about a particular region of the map. For example, a user can click on a state 412 such as Utah and view a more detailed map 414 showing where in that state 412 the secondary gift card market transactions occurred. This geographical diagram 400 can also allow a merchant to filter the displayed results on the map 408 by specific type of gift card, date, demographic information, gender, when, where, and who issued the gift card, and/or other data factors. In one aspect, the map 408 has a live update feature which shows an icon, animation, and/or a textbox in real time indicating transactions as they occur. For example, a green diamond and an associated tooltip can fade in over New Orleans, La., when a user sells a gift card on the secondary gift card market. The tooltip can show the face value of the gift card and the amount paid in exchange for the gift card. The green diamond and tooltip can fade out or disappear instantly after a predetermined time, when clicked away, and/or when another transaction occurs to replace it. The system can include these and other merchant reporting abilities.

Figure 5:
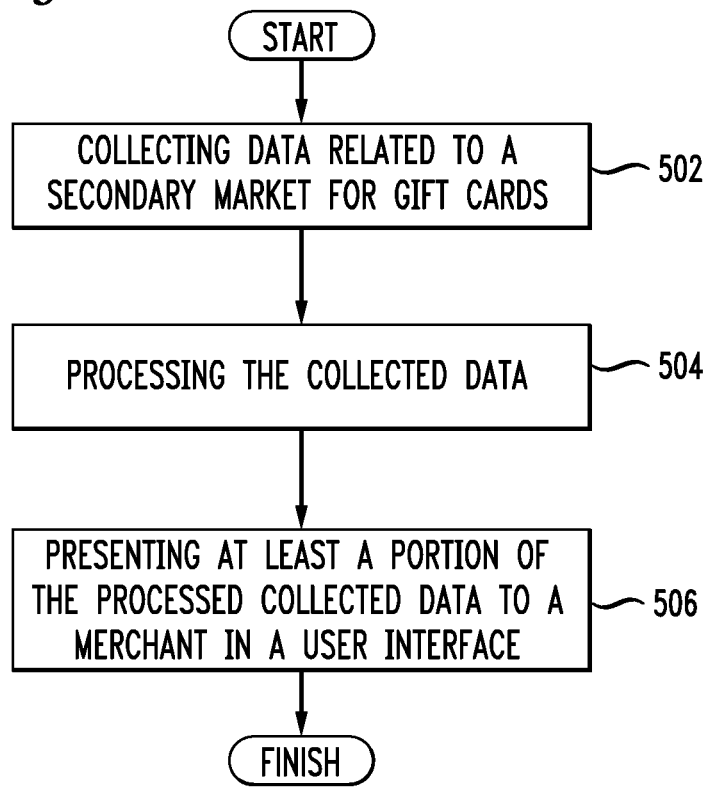
FIG. 5 illustrates an example method embodiment for tracking a secondary gift card marketplace.

Having disclosed system components and concepts, the disclosure now turns to the exemplary method embodiment for tracking a secondary gift card marketplace shown in FIG. 5. For the sake of clarity, the method is discussed in terms of an exemplary system such as is shown in FIG. 1 configured to practice the method. The system 100 first collects data related to a secondary market, which is made up of at least one transaction associated with a gift card, the transaction not involving an issuer of the gift card (502). The system 100 can collect this data from a multi-process secure gateway. Gift cards can include gift cards and/or gift codes. The collected data can further include multiple transactions associated with gift cards in the secondary market. Each gift card transaction of the multiple transactions does not involve an original issuing merchant of a gift card. The collected data can also include pricing information, demographic information, geographic information, and/or other consumer habits related to the gift card transactions.

The system 100 processes the collected data (504). The system 100 can process the collected data by aggregating, sorting, grouping, and/or normalizing the data. The system 100 can further remove from the collected data any private information or information which could personally identify an individual.

The system 100 presents at least a portion of the processed collected data to a merchant in a user interface (506). FIGS. 3 and 4 illustrate two example portions of the user interface. The system 100 can present a first portion of the processed collected data relating to the merchant and a second comparable aggregated portion of the processed collected data for comparison with the first portion. For example, the system 100 can display a segment of a merchant's own collected data alongside a sample of a nationwide collected data for comparison. The system 100 can also display a sample of market segment, regional, and/or national competitors' data so that a merchant can ascertain their standing in the marketplace. The merchant can use this type of information to make marketing and sales plans at a regional or even store by store level. For example, knowledge that one category of gift cards is being sold back at a high profit margin in Tennessee can influence a marketer's decision regarding how to best advertise and promote in Tennessee.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   collecting data of multiple transactions in which consumers, as non-issuers of gift cards, in a secondary market, sell the gift cards for at least one of cash, goods and services to yield collected data;
   aggregating the collected data to yield aggregated data; and
   presenting, via a user interface, at least a portion of the aggregated data to a merchant.

2. The method of claim 1, wherein the gift cards comprise at least one of gift cards and gift codes.

3. The method of claim 1, wherein the collected data further comprises at least one of pricing information, demographic information, and geographic information.

4. The method of claim 1, wherein aggregating the collected data further comprises categorizing the collected data based on a characteristic associated with at least one of the collected data and the multiple transactions.

5. The method of claim 1, wherein aggregating the collected data further comprises normalizing the collected data.

6. The method of claim 1, wherein aggregating the collected data further comprises removing private information from the collected data.

7. The method of claim 1, wherein aggregating the collected data further comprises removing information from the collected data which could personally identify an individual.

8. The method of claim 1, wherein presenting, via the user interface, at least the portion of the aggregated data further comprises presenting a first portion of the collected data relating to the merchant and a second comparable aggregated portion of the aggregated data for comparison with the first portion.

9. A system comprising:
   a processor; and
   a non-transitory computer-readable medium storing instruction which, when executed by the processor, cause the processor to perform operations comprising:
      collecting data of multiple transactions in which non-issuers of gift cards, in a secondary market, sell the gift cards for at least one of cash, goods and services to yield collected data;
      aggregating the collected data to yield aggregated data; and
      presenting, via a user interface, at least a portion of the aggregated data to a merchant.

10. The system of claim 9, wherein the collected data further comprises at least one of pricing information, demographic information, and geographic information.

11. The system of claim 9, wherein the non-transitory computer-readable medium further stores instructions which result in the operations further comprising:
   presenting at least the portion of the collected data by presenting a first portion of the collected data relating to the merchant and a second comparable aggregated portion of the collected data for comparison with the first portion.

12. A non-transitory computer-readable storage medium storing instructions which, when executed by a processor, cause the processor to perform operations comprising:

collecting data of multiple transactions in which non-issuers of gift cards, in a secondary market, sell the gift cards for at least one of cash, goods and services to yield collected data;

aggregating the collected data to yield aggregated data; and presenting, via a user interface, at least a portion of the aggregated data to a merchant.

13. The non-transitory computer-readable storage medium of claim 12, wherein aggregating the collected data further comprises categorizing the collected data based on a characteristic associated with at least one of the collected data and the multiple transactions.

14. The non-transitory computer-readable storage medium of claim 12, wherein aggregating the collected data further comprises normalizing the data.

15. The non-transitory computer-readable storage medium of claim 12, wherein aggregating the collected data further comprises removing private information from the collected data.

16. The non-transitory computer-readable storage medium of claim 12, wherein aggregating the collected data further comprises removing information from the collected data which could personally identify an individual.

17. The non-transitory computer-readable storage medium of claim 12, wherein presenting at least the portion of the aggregated data further comprises presenting a first portion of the collected data relating to the merchant and a second comparable aggregated portion of the aggregated data for comparison with the first portion.

* * * * *